June 17, 1969

O. R. BUTTS 3,450,941

LIGHT DIMMER SOCKET ADAPTER

Filed April 26, 1966

INVENTOR
ORVILLE R. BUTTS

BY
Cushman Darby & Cushman
ATTORNEYS

June 17, 1969
O. R. BUTTS
3,450,941
LIGHT DIMMER SOCKET ADAPTER
Filed April 26, 1966
Sheet 2 of 4
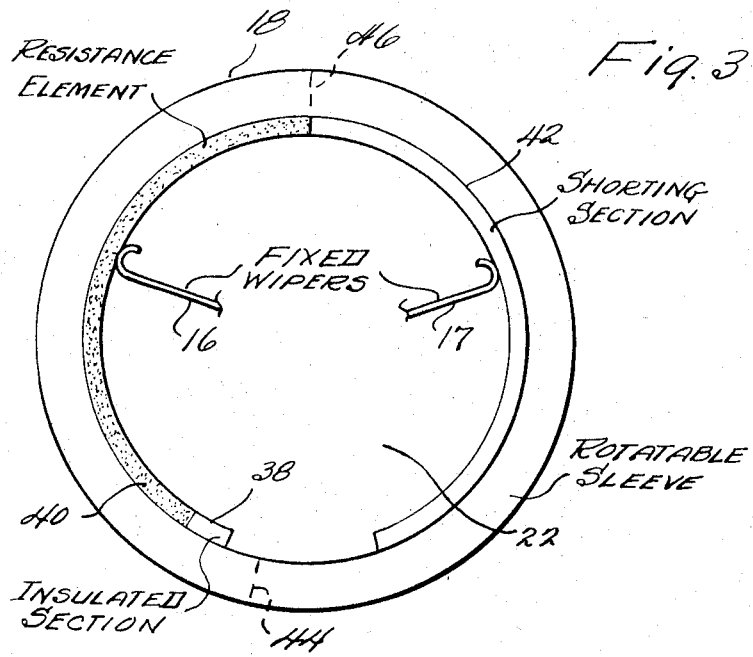
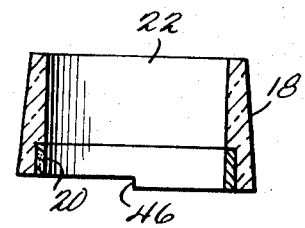
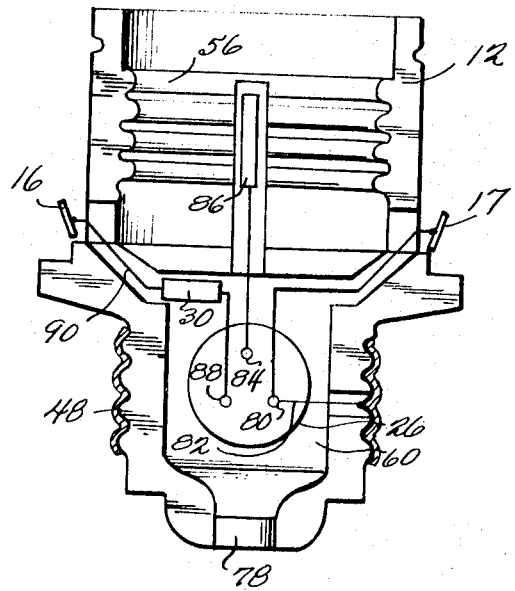
INVENTOR
ORVILLE R. BUTTS
BY
*Cushman, Darby & Cushman*
ATTORNEYS

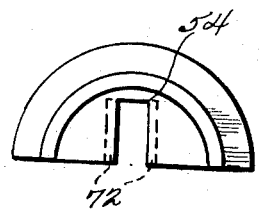
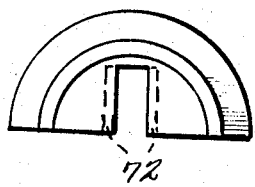
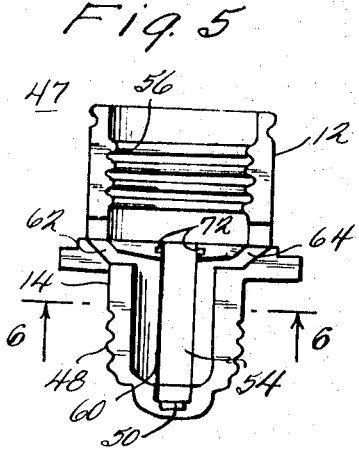
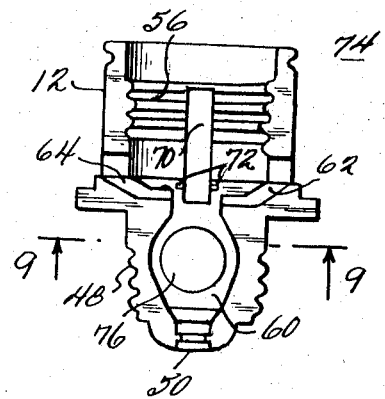
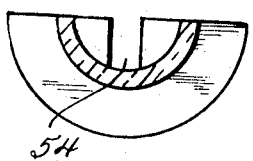

INVENTOR
ORVILLE R. BUTTS

United States Patent Office 3,450,941
Patented June 17, 1969

3,450,941
LIGHT DIMMER SOCKET ADAPTER
Orville R. Butts, Pennsauken, N.J., assignor to G-L Industries, Westville, N.J., a corporation of New Jersey
Filed Apr. 26, 1966, Ser. No. 545,495
Int. Cl. G05f 1/66; H05b 37/02, 41/36
U.S. Cl. 315—194　　　　　　　　　　　　　　8 Claims

ABSTRACT OF THE DISCLOSURE

A device for controlling the amount of electrical power delivered to a load from a power source including a Triac with two terminals connected between one side of the power source and the load, and the other terminal connected through a Diac to the common connection of a serially connected resistor and capacitor which are connected between the first two terminals of the Triac. The resistor is preferably a ring-shaped element mounted about the periphery of the device and having both conductive and resistive regions, so that the resistor alters the resistance of a path between the two wipers fixed on the periphery thereby to alter the amount of power delivered to the load. The device has especial utility in controlling the dimming of a light and the speed of a motor.

---

This invention relates in general to miniaturized, low-cost power control means and in particular to a unit where controllable means for delivering power to a load are mounted within the unit and where means for controlling the power delivering means is rotatably mounted around the periphery of the unit.

For example, this invention is readily adapted to lamp dimming and motor speed control devices. Many other specific applications of this invention will be apparent to one having ordinary skill in this are after having read the following description of the invention.

For purposes of the following specification and claims, the term "lamp" includes light bulb, while the term "lamp holder" includes those devices into which a lamp or light bulb is inserted.

Heretofore, lamp dimming circuits have primarily been mounted on the wall in place of the toggle switch. This limits their utility in the home, in particular, by a lay person. The instant invention will enable a housewife to install the dimmer in any table, wall, or floor lamp or the like in the house with no more difficulty than screwing a bulb into a socket. In this application of the lamp dimmer an adapter is provided which is screwed into the existing socket, the light bulb screwing into the adapter. The invention may also be incorporated into original lamp holders. Further, the invention may be incorporated into wall mounted dimmers or the handle of a solder iron.

The invention is particularly useful in adapters which provide existing lamps with a dimming capabilty. The adapter necessarily provides a limited amount of space within which the dimming circuitry can be incorporated. Since the dimming circuitry requires at least one solid state active element, several passive electrical components, and a lamp dimming control element, incorporation of all of these parts into the adapter becomes a crucial problem because of the limited space available within the adapter.

The instant invention resolves the above problem by mounting the lamp dimmer control element (rheostat, potentiometer, variable resistor, or the like) around the socket portion, for example, of the adapter and the remaining electrical components of the lamp dimmer circuit inside of the plug portion of the adapter. Thus, the unit can be installed in a lamp by simply unscrewing the bulb, screwing the lamp dimmer into the lamp, and screwing the bulb into the lamp dimmer. To operate the lamp dimmer, the lamp dimmer control element mounted around the lamp socket of the adapter is merely rotated to provide infinite lamp intensity control from full on to complete off, the off position being equivalent to the true "off" position of the lamp switch. Of course, other ranges would also be available other than from full to complete off and this can vary depending on the particular application. When the lamp dimmer is installed in original equipment such as a floor lamp holder, it is preferable to mount the lamp dimmer control element around the pole of the lamp holder.

Having now described the advantages of this invention in relation to lamp dimming devices, a brief description of the advantages thereof in relation to motor speed control devices will be given. Heretofore, a substantial number of these devices (especially those for use with such devices as hand drills) are so constructed as to stand on a table while the drill is in operation. Because of the movement of the drill, the speed control devices may frequently fall. To eliminate such problems, this invention allows the mounting of the speed control device on the power wire leading to the drill or like device. This is possible because the element (rheostat, potentiometer, variable resistor, or the like) which regulates the power delivered to the motor is mounted around the speed control device.

The basic advantage of mounting the power regulating element around the periphery of the unit which is to control the amount of power delivered to the load is the low cost of the unit. This low cost results not only from a substantial reduction in the cost of the component parts of the unit but also from a significant reduction in the amount of time required to assemble a unit. Further, because of the ease of assembling the unit, the proportion of flaw-free units produced is increased. Also because of the peripheral mounting of the power regulating element, it is possible to include, within a small space (the lamp dimmer adapter, for example), miniaturized solid state components necessary for completing the power control unit.

Accordingly, it is an object of this invention to provide an improved, low-cost power control unit where the power regulating element therefor is mounted around the periphery thereof.

It is another object of this invention to provide a low-cost, speed control unit adapted for incorporation into the power wires connected to a portable hand drill or the like.

It is another object of this invention to provide a small, inexpensive, infinitely adjustable, lamp dimming device that can be installed in any common electrical fixture with lamp holders for light bulbs such as wall, floor, or table lamp holder by untrained personnel.

It is another object of this invention to provide a lamp dimming device which can be manufactured with substantial reduction in the cost of the device, both in cost of parts and assembly time, this resulting from the rotatable mounting of the lamp dimming control element around the periphery of the dimming device itself or a pole of a floor lamp holder.

Although the use of solid state elements such as a three electrode alternating current, semiconductor switch has been suggested for lamp dimming circuits, it is felt the inclusion of such an element within an adapter for existing lamp holders is novel and the advantages described above also result from this feature.

Other objects and advantages of this invention will become apparent to those of ordinary skill in the art after reading this specification and appended claims in conjunction with the drawings, in which:

FIGURE 3 illustrates a lamp dimming control element mounted within a rotatable sleeve which, in turn, is adapted for rotation around the lamp socket portion of an adapter or of a lamp originally manufactured to provide a lamp dimming capability;

FIGURE 4 is a cross-sectional side view of the rotatable sleeve shown in FIGURE 3;

FIGURE 5 is a side view of one half of the molded parts of an adapter unit (without the lamp dimmer control circuitry incorporated therein);

FIGURE 6 is a cross-sectional bottom view of the adapter shown in FIGURE 5, taken along the line 6—6;

FIGURE 7 is a top view of the adapter unit shown in FIGURE 5.

FIGURE 8 is a side view of the other half of the molded parts of the adapter unit shown in FIGURE 5 (without the lamp dimmer control circuitry incorporated therein), the halves shown in FIGURES 5 and 8 mating to form the entire molded portion of the adapter unit;

FIGURE 9 is a cross-sectional bottom view taken along line 9—9 of FIGURE 8;

FIGURE 10 is a top view of the adapter unit shown in FIGURE 8;

FIGURE 11 is a cross-sectional side view of the adapter with the electrical components mounted therein.

Figure 1:
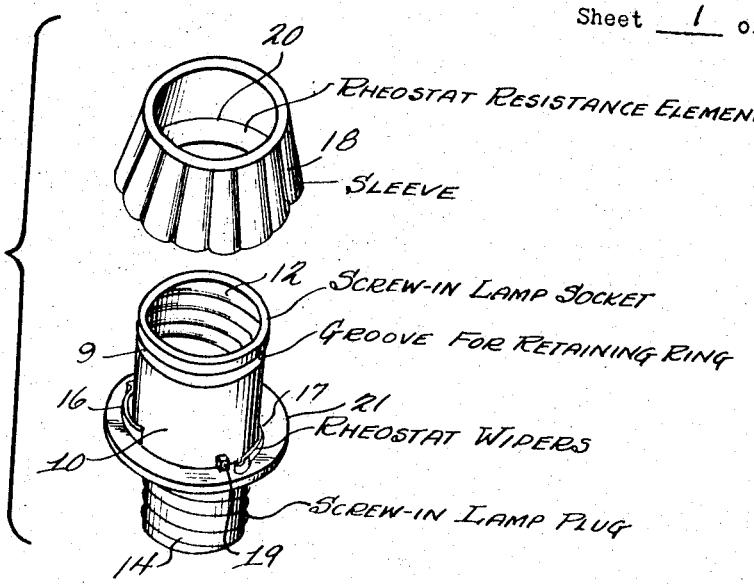
FIGURE 1 illustrates an adapter device dismounted to illustrate one aspect of this invention.

Referring to FIGURE 1, there is shown an isometric illustration of a dismounted lamp dimmer adapter unit illustrating one aspect of this invention. There is shown a member including a socket portion 12 and a screw-in plug portion 14 and rheostat wipers 16 and 17. A rotatable sleeve or member 18 having a rheostat element or lamp intensity control element 20 mounted around the periphery on the inside surface thereof is also provided as a part of the adapter unit. The sleeve 18 is normally mounted around the socket portion 12 so that the wipers 16 and 17 are in electrical contact with the rheostat element 20. A groove 9 within the socket portion 12 is provided for receiving a retaining ring (not shown), thus securing sleeve 18 to the member 10 between the ring and a shoulder 21. It must be emphasized that the particular construction and shape of members 10 and the sleeve 18 is not critical to this invention. For example, it also is possible to incorporate the shoulder 21 at the top of member 10 and to assemble the sleeve 18 around the socket portion 12 by passing the sleeve over plug portion 14 to the desired position around the socket portion. The retaining ring would then be placed at a position approximately the same as that of shoulder 21 shown in FIGURE 1.

Within the plug portion 14 is enclosed the balance of the lamp dimming circuit, there being an electrical contact from the wipers 16 and 17 to the circuitry enclosed within portion 14.

Figure 2:
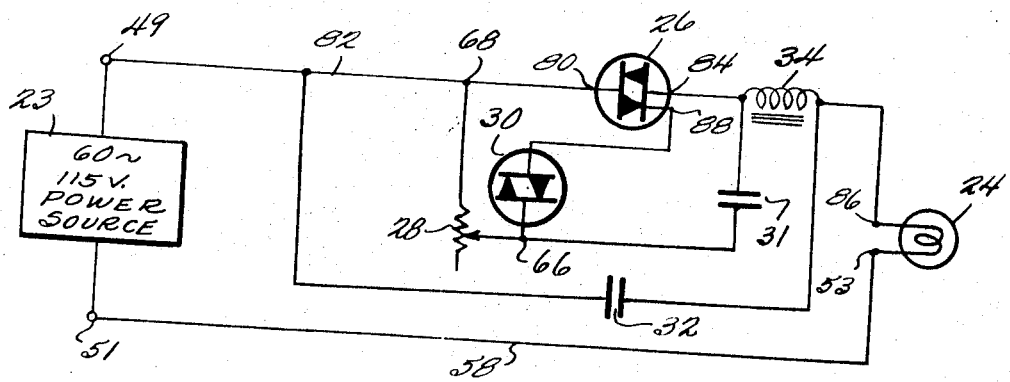
FIGURE 2 is a schematic diagram of the lamp dimmer circuitry.

Before proceding further with structural details of this invention, reference should now be made to FIGURE 2 which is a circuit diagram of a lamp dimmer circuit which may be used in practicing this invention. Current for lamp 24 is typically provided from a 60 cycle, 115 volt power source 23. The amount of current delivered to lamp 24 is determined by controllable, three electrode, alternating current, switch 26. Controllable switch 26 is available under the trade name Triac manufactured by General Electric. For a further description of this element, see Electronics, p. 34, Mar. 13, 1964. Controllable switch 26 is controlled by lamp dimming control element or power regulating means 28, which may be the rheostat element 20 (as heretofore described) together with the wipers 16 and 17 illustrated in FIGURE 1. The position of the rotatable sleeve with respect to the wiper elements 16 and 17 determines the setting of the control element 28, as will be described in more detail hereinafter. Diode, alternating current switch 30 (available under the trade name Diac) is provided to trigger the switch 26. The action of diode switch 30 is similar to that of a neon bulb. Capacitor 31 and rheostat 28 control or regulate the amount of current that controllable switch 26 delivers to lamp 24, as will be described in more detail hereinafter. Capacitor 32 and inductor 34 are provided for transient suppression, especially for the reduction of transients which effect radios or televisions connected to the same line as the lamp.

Thus, the operation of the above electronic lamp dimming circuitry is briefly as follows. With the application of alternating current from the source 23, bi-directional current flows in lamp 24 because of the nature of controllable switch 26. However, the amount of current flowing through lamp 24 is adjustable in accordance with the setting of rheostat 28.

Figure 12:
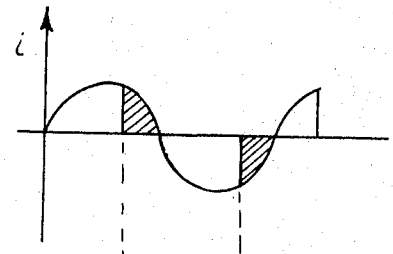
FIGURE 12 is a graph illustrating the applied line current.
Figure 13:
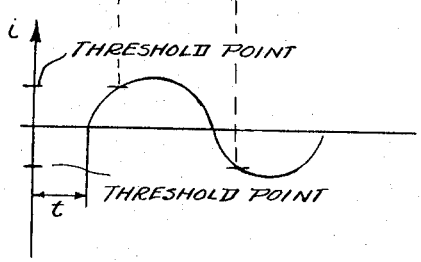
FIGURE 13 is a graph illustrating the wave form in FIGURE 12 delayed by a variable amount of time.

Referring to FIGURE 12, there is a graph illustrating the waveform of the current applied from source 23. The waveform shown in FIGURE 13 is the same as that shown in FIGURE 12 except that it is delayed by a period of time, $t$. Rheostat 28 and capacitor 31 comprise a phase shifting circuit where the position of the wiper of rheostat 28 determines the time period $t$. Controllable switch 26 is actuated or triggered into current conduction when the breakdown piont of diode switch 30 is exceeded as shown in FIGURES 12 and 13, the cross-hatched area of the FIGURE 12 waveform representing the current delivered to the load. Since time $t$ can be varied by rheostat 28, it follows that rheostat 28 also controls the amount of current delivered to the lamp 24 by the controllable switch 26.

An obvious modification to the invention would be to use a unitary element which combines the functions of controllable switch 26 and diode switch 30. Such an element is presently available under the trade name Quadrac.

Thus, the intensity of lamp 24 is variable over a wide range of values, depending on the setting of rheostat 28.

Referring now to FIGURE 3, there is shown the rheostat element 20 which includes three different portions, these portions respectively being a non-conductive portion 38, a resistive portion 40, and a conductive portion 42. The rheostat element is preferably produced from a strip of material which is bent and snapped into a groove disposed around the periphery on the inside of sleeve 18. Further, the resistive and conductive portions, 40 and 42 respectively, may each extend approximately halfway around the rheostat element. Thus, the portions 40 and 42 are always in respective contact with fixed wipers 16 and 17 while the rheostat is operative regardless of the angular position of the sleeve 18. From FIGURE 3, it can be seen that the amount of control that the rheostat element 20 exerts on the lamp intensity depends on the angular position of the sleeve 18. Thus, in the position shown, a circuit is completed from wiper 17 through half of the conductive portion 42 and then through half of the resistive portion 40 to the wipers 16. In order to completely turn the light bulb off, the sleeve 18 is rotated until the wiper 16 is in contact with the non-conductive or insulated portion 38, the wiper 17 still being in electrical contact with the conductive portion 42. The resistive portion 40 is preferably 400,000 ohms from end-to-end and is preferably ½ watt. Complete off is, of course, optional and the obtainable range may extend to low intensity to full intensity without complete off. Also, the full on position may provide the full light intensity obtainable if there were no dimmer circuitry. Typically, a small value of resistance is needed in series with the diode switch 30 when the controllable switch 26 is delivering substantially full power to the lamp 24. In lieu of connecting a separate resistor in series with the diode switch 30, the movement of sleeve 18 may be so restricted (as will be described hereinafter) that a small portion of rheostat 28 remains in series with the diode switch 30.

As shown in FIGURES 3 and 4, ridges 44 and 46 are provided on the base of sleeve 18 to insure proper positioning of the sleeve with respect to the wipers 16 and 17. Stop or projection 19 (see FIGURE 1) is provided on the side socket portion 12 to restrict movement of the sleeve 18 to approximately 180°. The angular positioning of stop 19 in relation to wipers 16 and 17 determines what conditions will be at the ends of the range of lamp intensities—that is, whether intensity will vary from complete off to full on, for example. This angular positioning of stop 19 in relation to wipers 16 and 17 also limits the rotation of sleeve 18 so that a small portion of rheostat 28 remains in series with diode switch 30 when the controllable switch 26 is delivering substantially full power to the lamp 24. An opening 22 is provided to permit mounting of the sleeve 18 over the socket portion 12 of the adapter unit 10. As shown in FIGURES 3 and 4, the wipers are fixed in space with respect to the rotatable rheostat. It would, of course, be an obvious modification to rotatably mount the wipers and have the rheostat fixed in space. The important thing is to obtain relative rotation between the rheostat and the wipers.

Referring to FIGURE 5, there is shown a side view of one half 47 of the molded parts of the adapter unit, the electrical components of the dimmer circuitry not being shown. The plug portion 14 is threaded at 48 and contains an opening 50 at the bottom thereof for receiving a metal contact (not shown) which is connected to one side of the power supply (see terminal 51 in FIGURE 2). A groove 54, extending from the plug portion to the socket portion of the adapter 10, is also provided. The conductor passing through the opening 50 extends along the groove 54 to the center section of the socket portion (see terminal 53 in FIGURE 2).

Referring to FIGURE 8, there is shown a side view of the other half of the molded parts of the adapter unit 10, which mates with the first half 47 shown in FIGURE 5. An opening 50 is provided through the side of the plug portion, this opening receiving the controllable switch 26 and a metal conductor (not shown) which is connected to the opposite side of the power supply (see terminal 49 in FIGURE 2) from a point outside the adapter. A metal conductor cap (not shown) is threaded onto threaded portion 48 when the adapter unit is completely assembled.

A groove 70, extending from the plug portion to the socket portion of the adapter 10, is also provided. A conductor (not shown) extends along this groove 70 from the controllable switch 26 (not shown) to the threaded portion 56 at the socket portion. Thus, a continuous electrical connection is provided from the center contact of the plug portion 48 through the opening 50 along the groove 54 and to the center connection of the socket portion. Hence, the connection from terminal 51 of the power source 23 to terminal 53 of the lamp filament (see FIGURE 2) has now been described since the lamp screws into socket portion 12. This connection corresponds to the line 58 shown in FIGURE 2.

The controllable switch 26, together with the diode switch 30 and capacitors 31 and 32 and inductor 34, are mounted within the hollow portion 60 of adapter unit 10 shown in FIGURE 5. Channels 62 and 64 provide an opening through which the wipers 16 and 17 are respectively connected from the rheostat element 20 surrounding socket portion 12 to the electrical components (not shown) mounted within portion 60 of FIGURE 5. Wipers 16 and 17 may be respectively associated with channels 62 and 64. If such is the case, the wipers 16 and 17 are respectively associated with terminals 66 and 68 of FIGURE 2. Channel 70 in FIGURE 8 provides an opening through which an electrical conductor can be passed to the side of the socket portion 12. Thus, two terminals for the bulb positioned within socket 12 are provided—that is, the first terminal is positioned at the base of the socket portion (see terminal 53 of FIGURE 2) and the second terminal is positioned at the threaded portion of the socket portion (see terminal 86 of FIGURE 2), it being connected to the conductor passing through channel 70 to the electrical components in the portion 60. Grooves 72 receive an insulator which electrically isolates the conductor at the base of socket portion 12 from the electrical components in the portion 60.

FIGURE 6 illustrates more clearly the channel 54 which extends through the adapter unit 10 to the socket portion 12 as already described. FIGURE 7 further illustrates the construction of the adapter unit.

FIGURE 8 illustrates the other half 74 of the adapter unit 10, which mates with the first half 47, shown in FIGURE 5. The portions of half 74, which serve a similar function to those already described for FIGURE 5, have the same reference numerals. The portion 60 of half 74 is differently shaped from the corresponding portion of half 47. The reason for this is to accommodate the typical shape of the controllable switch 26. Thus, this element may have a round, cylindrical shape and the provision of the circular area 76 readily accommodates this component. Of course, the shaping of the portion 60 can readily vary depending on the shape of the electrical components employed.

Reference to FIGURES 9 and 10 will further illustrate the constructional details of the half 74.

Referring now to FIGURE 11, there is a diagrammatically illustrated half 47 together with the electrical components contained therein. For the sake of simplifying this combined representation, certain of the features described in FIGURE 5 and FIGURE 8 have been omitted. Common reference numerals are employed in FIGURES 2 and 11 to describe the same electrical connections and components. A conductor shell 78 is provided around the sides of the connector unit and is normally connected to one terminal of the power supply. This terminal is connected to the input terminal or electrode 80 of controllable switch 26, as shown in FIGURES 2 and 11. The connection is diagrammatically shown at 82 in FIGURE 11. Further, terminal 80 is connected to wiper 17 which corresponds to point 68 in FIGURE 2.

Output terminal or electrode 84 is connected to a side conductor strip 86 (corresponding to terminal 86 in FIGURE 2) on the side of socket portion 12. The control terminal or electrode 88 is connected to wiper 16 by conductor 90 which is diagrammatically indicated through diode switch 30.

Thus, the connection of the power source 23 to the lamp 24 has now been described. The path of conductor 58 (see FIGURE 2) to the terminal 53 of the lamp 24 has been described in relation to FIGURE 5. The path from the opposite side 49 of the power source through the controllable switch 26 to the terminal 86 of the lamp 24 has been described in relation to FIGURE 11. Further, the connection of the rheostat element 20 to the controllable switch 26 has also been described. The connection of the capacitor elements 31 and 32 and inductor 34 into the circuitry shown in FIGURE 11 has not been shown in order to clarify the presentation of the construction of the essential features of the invention. However, it would be well within the scope of one skilled in this art to provide for the electric connection of these components in view of the circuitry shown in FIGURE 2. Preferably the diode switch 30 and capacitors 31 and 32 and inductor 34 would be mounted adjacent to the base of current regulator 26 but separated therefrom by a suitable spacer to insure proper thermal and electrical insulation of the components from one another. This results in a compact arrangement of these elements within the hollow portion 60.

It should be further noted that the electrical connection of the rheostat element 20 within the control circuit of the controllable switch 26 results in a minimum amount of current from the power source 23 flowing through the rheostat element. Thus, the heat dissipated by this element is minimized. Hence, the rotatable sleeve 18 does not overheat. Further, since controllable switch 26 is an electronic device (as opposed to an element such as a resistor), it also does not tend to overheat. Thus, the overall adapter unit remains cool to the touch while in operation. Also, an appropriate heat flow path is provided from the unit for what heat is generated—that is, a suitable thermal conductor is placed in contact with the controllable switch 26, passed through opening 76 or another suitable opening in the plug portion 14 to the metal cap positioned on threaded portion 48. Thus, the cap plus whatever it is in thermal contact with acts as a heat sink.

It will now be fully appreciated that the provision of the rotatable sleeve 18 around the socket portion of the adapter unit 10 permits the desired miniaturization of the dimming control circuitry. That is, given standard size lamp sockets employed in present day lamps, there is not enough room within the plug-in portion of an adapter built for such units to contain the electrical components of the dimming circuitry together with a rheostat element. Hence, the provision of the rheostat element outside of the adapter permits the desired miniaturization. Further, because of the low heat generated by the rheostat element, the device remains safe to the user. Also, the ease with which the sleeve is mounted on the socket portion results in economical manufacturing, both in terms of cost of parts and assembly time.

Figure 14:
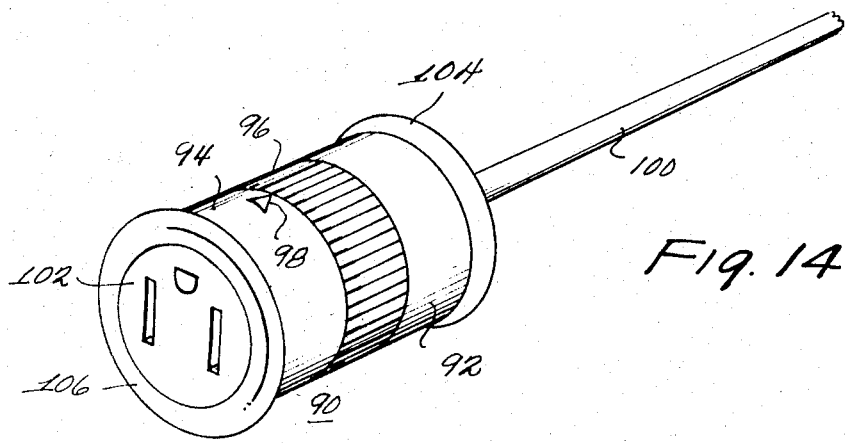
FIGURE 14 is an isometric illustration of a motor speed control unit.

Reference should now be made to FIGURE 14 which isometrically illustrates a portable motor speed control unit 90 utilizing this invention. The motor being controlled could be in a portable hand drill, for example. The unit 90 includes a metal cup or portion 92 which acts as a housing for the components of the speed control circuitry and as a heat sink for the active components contained within the housing. Cup or portion 94 provides support for a rotatable sleeve or ring 96 mounted around the periphery of the unit 90 and is typically made of plastic. Sleeve 96 is typically made of plastic and has a rheostat resistance ring disposed on the inside surface thereof in a manner similar to that shown in FIGURE 3. The outside surface of sleeve 96 may be provided with graduations which correspond to various motor speeds. A pointer 98 may also be provided on the outside surface of unit 90 to indicate the motor speed. The speed control unit 90 is connected to a power wire 100 which is adapted for insertion into a 60–cycle, 115 volt outlet terminal, for example. The unit 90 is also provided with a receptacle portion 102 for receiving the plug attached to the motor (not shown), the speed of which is being controlled. Resilient sleeves 104 and 106 are respectively mounted around the unit at the ends thereof. These sleeves provide protection of the unit 90 against falls and other types of shock and vibrations.

Figure 15:
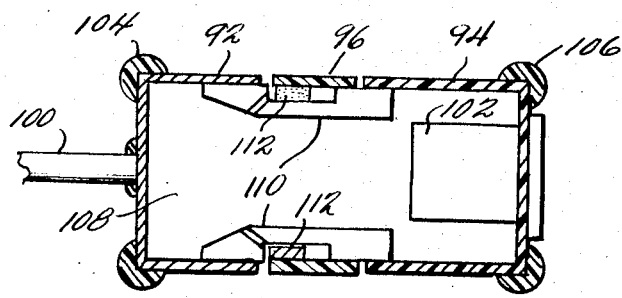
FIGURE 15 is a cross-sectional view of the control unit shown in FIGURE 14.

Reference should now be made to FIGURE 15 which shows a cross-sectional side view of unit 90. The electrical components of the dimming circuitry are preferably mounted within space 108, a suitable heat conduction path being provided between the active components and the metal shield 92. A plastic insert 110 is approximately mounted within the metal portion 92. The insert 110 comprises two pieces, in the sense that parts 47 and 74 of FIGURES 5 and 8 are two pieces which make up a single adapter unit. Thus, the insert 110 is also formed into two pieces for ease of assembly and ready connection of the electrical components within space portion 108 to rheostat ring 112 mounted on the inside surface of sleeve 96. The cups 92 and 94 are integral units—that is, one piece. After the insert 110 is mounted within cup 92, the plastic cup 94 is then appropriately mounted onto the insert 110 by retaining rings, for example, to complete assembly of the speed control unit.

There are, of course, further applications where it would be desirable to have a device such as unit 90 connected into the power lead 100 to control the amount of power delivered to a load.

What is claimed is:
1. A device for controlling the amount of electrical power delivered to a load from a power source comprising:
   electrical means connected to said power source and to said load for delivering said power to said load, said electrical means being adjustable to change the amount of said power delivered to said load,
   controlling means for adjusting said electrical means including a ring-shaped resistor having a variable resistance mounted around the periphery of said device and a pair of wipers, said resistor and at least one of said wipers being movable with respect to each other for altering the resistance of said variable resistor and changing thereby the amount of power delivered to said load, and including the improvement wherein:
   said wipers are fixedly mounted on the periphery of said device and said resistor rotates about said periphery altering the resistance of the path between said wipers, and
   said resistor is comprised of resistive and conductive regions so that said path includes both resistive and conductive regions and the resistance of said path is determined by the length of the resistive region included in said path.

2. A device as in claim 1 wherein said device includes a hollow portion for receiving power conveying means to said load and said electrical means is mounted within said device.

3. A device as in claim 2 wherein said device is for controlling the intensity of an electric light bulb and said hollow portion is adapted to receive said bulb.

4. A device as in claim 1 wherein each of said resistive and conductive regions makes up about half of the circumference of said ring shaped resistor.

5. A device as in claim 4 wherein said resistor includes a non-conductive insulating region so that the resistance of said path is high enough to so prevent any substantial power from being conveyed to said load when said path includes said non-conductive insulating region.

6. A device as in claim 1 wherein said electrical means includes a controllable three electrode alternating current switch having two terminals connected between one side of said power source and one side of said load, said controlling means includes a capacitor connected in series with said resistor, said serial connected capacitor and resistor being connected between said two terminals and a diode alternating current switch connected between the third terminal of said three electrode switch and the point where said capacitor and resistor are serially connected and wherein the other side of said load is connected to the other side of said source.

7. A device having a casing, for controlling the amount of energy delivered to a load from a power source comprising:
   a sleeve mounted on the periphery of said device and being rotatable about said device,
   a ring-shaped element mounted on the inside of said sleeve having a resistive region, a conductive region and a non-conductive region each comprising a portion of the circumference of said ring,
   a pair of wiper contacts mounted on said device so as to be in contact with said element so that an electrical path is established between said wipers made up of at least one of said regions and so that the rotation of said sleeve alters the resistance of said path,
   electrical means connected to said power source and to said load for delivering power to said load and
   switching means connected to said wiper contacts and to said delivering means for controlling the amount of power delivered according to the resistance of said path.

8. A device as in claim 7 wherein said electrical delivering means includes a three electrode alternating current switch having two terminals connected between one side of said power source and one side of said load, said switching means includes a capacitor connected in series with said path, said serial connected capacitor and path being connected between said two terminals and a diode alternating current switch connected between the third teriminal of said three electrode switch and the point where said capacitor and resistor are serially connected and wherein the other side of said load is connected to the other side of said source.

References Cited
UNITED STATES PATENTS

| | | | |
|---|---|---|---|
| 3,058,020 | 10/1962 | Balan | 323—22 X |
| 3,147,928 | 9/1964 | Carpenter | 323—22 X |
| 3,209,228 | 9/1965 | Gawron | 318—345 |
| 3,300,711 | 1/1967 | Duncan | 323—22 |
| 3,320,437 | 5/1967 | Myers | 307—88.5 |
| 3,331,013 | 7/1967 | Cunningham | 323—22 |
| 2,677,124 | 4/1954 | Hallerberg et al. | 338—73 X |

OTHER REFERENCES

Economy Power Semiconductor Applications, Gutzwiller and Howell, "Basic Full-wave Circuit," G. E. Semiconductor Products Dept., March 1965, p. 15.

JOHN F. COUCH, *Primary Examiner.*

A. D. PELLINEN, *Assistant Examiner.*

U.S. Cl. X.R.

315—251, 272; 318—345; 323—22, 24, 36